No. 608,278. Patented Aug. 2, 1898.
P. BENSON.
CAPO TASTO.
(Application filed May 28, 1897.)
(No Model.)

Witnesses
C. F. Kilgore
F D Merchant

Inventor
Peter Benson
By his Attorney
Jas P Williamson

THE NORRIS PETERS CO., PHOTO-LITHO., WASHINGTON, D. C.

UNITED STATES PATENT OFFICE.

PETER BENSON, OF MINNEAPOLIS, MINNESOTA.

CAPO TASTO.

SPECIFICATION forming part of Letters Patent No. 608,278, dated August 2, 1898.

Application filed May 28, 1897. Serial No. 638,512. (No model.)

*To all whom it may concern:*

Be it known that I, PETER BENSON, a citizen of the United States, residing at Minneapolis, in the county of Hennepin and State of Minnesota, have invented certain new and useful Improvements in Capo Tastos; and I do hereby declare the following to be a full, clear, and exact description of the invention, such as will enable others skilled in the art to which it appertains to make and use the same.

My invention has for its object to provide an improved capo tasto for use on guitars. The well-known use of this instrument or device in connection with a guitar is to throw the guitar from one key to another without changing the tension of the strings or, in other words, without retuning the guitar. These capo tastos as hitherto constructed have been subject to numerous objections, the most prominent of which are complication and flimsiness of construction—features which make the device of too great first cost and also short-lived.

In my invention I propose to simplify and reduce the cost of the device and at the same time to increase the durability and efficiency of the same.

To these ends my invention consists of the novel devices and combinations of devices hereinafter described, and defined in the claims.

In the accompanying drawings like numerals indicate like parts throughout the several views.

Figure 1:
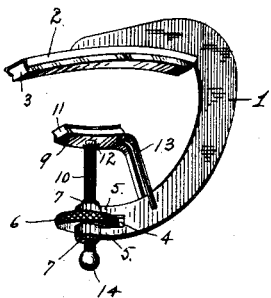
Figure 2:
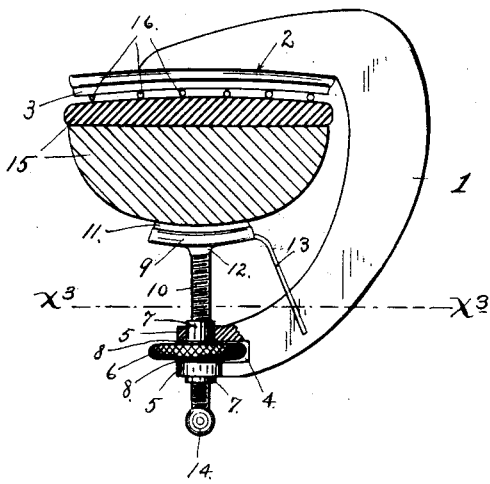
Figure 3:
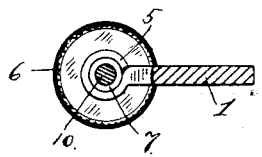

Figure 1 is a perspective view of my improved capo tasto. Fig. 2 is a side view of the said capo tasto shown as applied in working position on a guitar-neck, said guitar-neck being shown in section; and Fig. 3 is a horizontal section taken on the line $x^3 x^3$ of Fig. 2.

1 indicates the body of the capo tasto, which has substantially the outline of a capital C. To one prong or extremity of the body-section 1 the bar 2 is rigidly secured. This bar 2 is formed from light metal bent into such shape that it is adapted to retain a facing-strip 3. In other words, the channel formed in the face of the bar 2 is dovetailed in cross-section and the facing-strip 3 is of corresponding cross-section. One end or extremity of the channel formed in the bar 2 is preferably left open, so that the facing-strip 3 may be removed or placed in working position by endwise movement. This facing-strip 3 is preferably constructed of leather, but may be made of other material.

The lower prong of the body or clamp 1 is bifurcated, as shown at 4, and the bifurcated portions or prongs 5 are rolled up to form a seat, the axis of which extends substantially at a right angle to the bar 2.

6 indicates a knurled nut which works in the bifurcation 4 of the body-section 1, with its hubs 7 journaled in the seat formed by the coiled pronged ends 5. The nut 6 is also preferably provided with wearing-surfaces 8, which prevent the nut 6 from engaging the prongs 5.

9 indicates the presser-foot, the stem 10 of which is screw-threaded and works with screw-threaded engagement through the nut 6 and hubs 7 thereof. The presser-foot 9 is much shorter than the bar 2, but is otherwise very similar in construction, in that it is formed from light metal bent to form a channel which is dovetailed in cross-section.

11 indicates the removable facing-strip, preferably of leather, which in cross-section corresponds to the form of the channel in the presser-foot 9.

It should be here noted that both of the facing-strips 3 and 11 project a considerable distance beyond the dovetailed channels to which they are secured. The presser-foot 9 and its stem 10 are rigidly secured together at 12 by a very strong rigid joint. The presser-foot 9 is kept from turning by a pair of fingers or prongs 13, which are rigidly secured to and project from one end of the same and straddle the body or clamp 1. As shown, the lower end of the screw-threaded stem 10 is provided with an enlarged head 14. This head 14 should be removably secured to the stem 10 and should be placed in position after the parts of the capo tasto are put together. To put the parts of the capo tasto together, the nut 6 should first be screwed onto the stem 10, and after this has been done the prongs 5 should be bent around the hubs 7 of said nut 6, as best illustrated in Fig. 3.

The capo tasto is placed in position, as illustrated in Fig. 2, with the facing-strip 3 of the bar 2 pressing the strings and with the facing-strip 11 of the presser-foot 9 pressing the under surface of the guitar-neck. 15 indicates the guitar-neck, and 16 the strings.

From the foregoing it is thought to be evident that I have accomplished the objects set forth in the introduction to this case. Inasmuch as the presser-foot 9 and its stem 10 are rigidly secured together said presser-foot cannot become loose from the stem and is always held in proper working position. As is obvious, the presser-foot is clamped against the guitar-neck and removed therefrom simply by turning the knurled nut 6. The facing-strips 3 and 11 are securely held by their dovetailed engagement with the seats in the bar 2 and presser-foot 9, respectively. With this construction cement is not a necessity. When the said facing-strips are worn out or mashed down, they may be removed and replaced by new ones with the greatest ease.

It will of course be understood that various alterations in the specific details of construction above set forth may be made without departing from the spirit of my invention.

What I claim, and desire to secure by Letters Patent of the United States, is as follows:

1. The combination with the body and string engaging bar, of the presser-foot 9 provided with the pronged extension 13 straddling said body, the screw-threaded stem 10 rigidly secured to said foot 9 and working through a seat in said body, and the nut 6 working on said screw-threaded stem 10 and fixed against endwise movement in one end of said clamp-body, substantially as described.

2. The combination with a clamp-body 1 provided with a suitable bar at one end, and at its other end bifurcated at 4 to form the prongs 5, which prongs are coiled, of the nut 6 with hubs 7 held by said coiled prongs 5, and the presser-foot provided with a screw-threaded stem which works with screw-threaded engagement through said nut 6 and the hubs 7 thereof, substantially as described.

In testimony whereof I affix my signature in presence of two witnesses.

PETER BENSON.

Witnesses:
L. C. ELMORE,
F. D. MERCHANT.